United States Patent [19]

Klinkel

[11] Patent Number: 4,713,047
[45] Date of Patent: Dec. 15, 1987

[54] TUBULAR BAG CLOSING MACHINE

[75] Inventor: Wolfgang Klinkel, Bigorio, Switzerland

[73] Assignee: ILAPAK Research & Development S.A., Lugano, Switzerland

[21] Appl. No.: 830,641

[22] Filed: Feb. 18, 1986

[30] Foreign Application Priority Data

Feb. 18, 1985 [CH] Switzerland .......................... 738/85

[51] Int. Cl.$^4$ ................................................ B31B 1/00
[52] U.S. Cl. ..................................... 493/34; 493/203; 493/207; 493/209; 137/487.5; 156/358; 156/583.1
[58] Field of Search ................ 493/189, 199, 206, 207, 493/209, 34, 474, 475, 203; 156/358, 583.1; 137/487.5

[56] References Cited

U.S. PATENT DOCUMENTS

| | | | |
|---|---|---|---|
| 3,692,611 | 12/1970 | Kuhnle | 156/358 |
| 3,726,307 | 4/1973 | Corman et al. | 137/487.5 |
| 3,925,139 | 12/1975 | Simmons | 156/358 |
| 4,243,469 | 1/1981 | Evers et al. | 156/583.1 |
| 4,479,844 | 10/1984 | Yamada | 493/189 |
| 4,638,444 | 1/1987 | Laragione et al. | 137/487.5 |

OTHER PUBLICATIONS

Smith; Circuit, Devices, and Systems; Copyright 1976, pp. 685–689.
Holman; Experimental Methods for Engineers 3rd Ed.; Copyright 1978; pp. 191–193.

Primary Examiner—Frederick R. Schmidt
Assistant Examiner—Robert Showalter
Attorney, Agent, or Firm—Frishauf, Holtz, Goodman & Woodward

[57] ABSTRACT

To provide for uniform pressure, under predetermined conditions, of application of closure sealing jaws for a bag making machine, to close thermoplastic tubular foils, a hydraulic pressure element (7;26,28) applies the pressure of a pressure jaw (1) against another (2), with the foil interposed; the hydraulic pressure is sensed by a transducer (11), converted into an electrical signal and compared with a command set signal (22), any error or deviation being fed back in a closed loop to a servo positioning valve (13,15) to thereby set the hydraulic pressure with which the movable jaw (1) is applied against a fixed jaw (2) in accordance with commanded value.

2 Claims, 1 Drawing Figure

TUBULAR BAG CLOSING MACHINE

A pair of jaws travel towards each other, to pinch the polyethylene and, under the influence of heat, and adhesive, or the like, seal opposed walls of the polyethylene to form a closure for a bag.

BACKGROUND

To close bags and the like supplied to a closure machine in the form of an open tube, it has previously been proposed to apply two jaws against the walls of the tube, and move the jaws towards each other. The jaws, in form of a pair, seal the bag walls. For an optimum seal, three parameters are important: time; temperature; application pressure, that is, pressure between the jaws and with which the walls are pressed together.

The first two parameters, time and temperature, can be easily defined. The timing can be controlled by mechanical or electrical timing apparatus, and can be determined by machine construction, or by the use of electronic control apparatus, preferably, with indicators showing the appropriate timing. Likewise, temperature can be readily controlled, for example with electric or steam heaters, and the temperature at the jaws indicated by suitable thermocouples coupled to temperature indicators or other types of thermometers. The third parameter, pressure, is difficult to control and is usually set empirically. The pressure is that which is applied to the foil walls upon sealing, or welding of the walls of the foil or film. Usually, the pressure is set empirically, dependent on the experience of the operator of the machine. The wall thickness of the foil varies; most commercial packaging foil is supplied with fairly substantial tolerance ranges. The application pressure of the jaws towards each other, between which the foils are pinched, should vary in accordance with the thickness of the foil, the type of foil, or the material thereof, and foil composition. While data regarding optimum pressures can be derived, it was heretofore usually customary to adjust the operating pressure in accordance with experience and knowledge of the operator. Optimum engagement pressure, thus, cannot be obtained at all times.

THE INVENTION

It is an object to provide a bag closure apparatus in which the application pressure of closing jaws can be accurately controlled in accordance with a command set input, and to accurately and automatically reproduce the application pressure during sequential repetitive operating cycles of the machine, as seams or welds are being formed thereby.

Welds are usually formed by directly heating the material so that it softens sufficiently to melt together and form a weld seam - not melting, however, so much as to run off; seams are formed by applying an adhesive, which is usually pressure and/or heat-sensitive, and applying the jaws against the foils with the adhesive thereon to seal the respective foil walls together.

Briefly, in accordance with the invention, a fluid pressure element, typically a hydraulic, but it may be a pneumatic element, is provided pressing at least one of the closing jaws towards the other. The actual pressure which is being applied by the fluid pressure element is sensed, and compared with a set, or commands pressure; in case of deviation, a controlled valve is operated to either increase or decrease the sensed actual pressure until it matches the command pressure. Thus, a closed servo loop is provided, in which the actual pressure condition accurately matches the commanded pressure condition.

The system has the advantage that the application pressure is automatically and exactly matched to the command set value, thus substantially simplifying the overall machine; the resulting weld or sealing seams will be uniform, and not subjected to differences in quality.

The commanded value can readily be determined either from tables, or empirically, by a few simple tests, in accordance with prior knowledge of an experienced operator. Thereafter, even unskilled and inexperienced personnel can operate the machine since the set command will be accurately reproduced and, upon change of materials, a different setting can be entered in the apparatus without requiring any further readjustment or experimentation.

DRAWINGS

FIG. 1 is a schematic side view of a bag closing apparatus having a mechanical drive;

DETAILED DESCRIPTION

Figure 1:
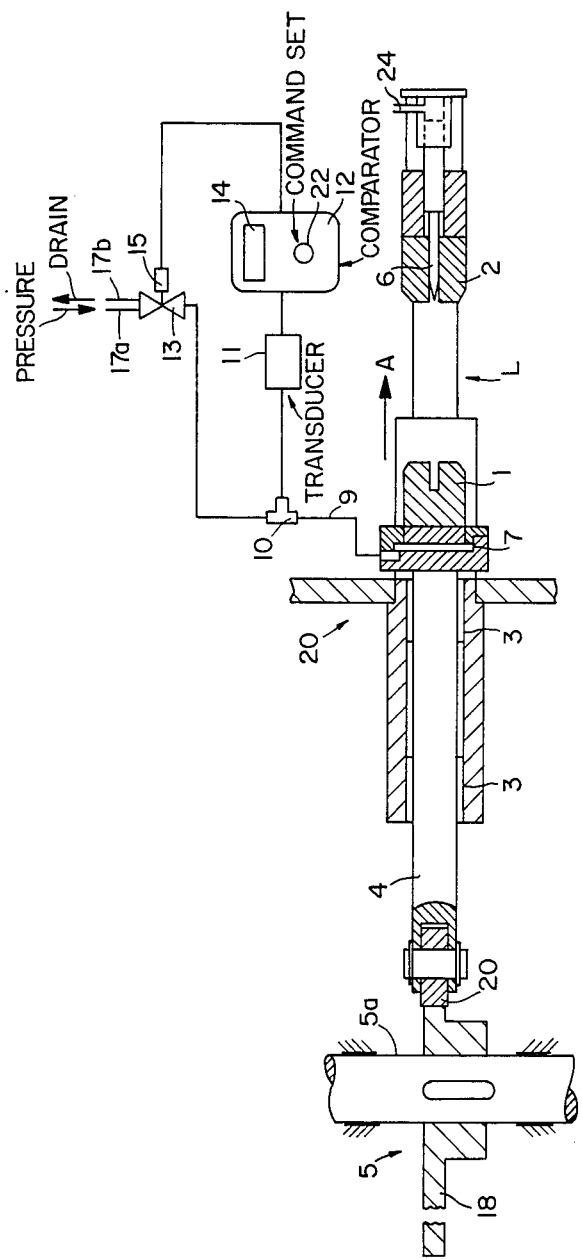
Figure 2:
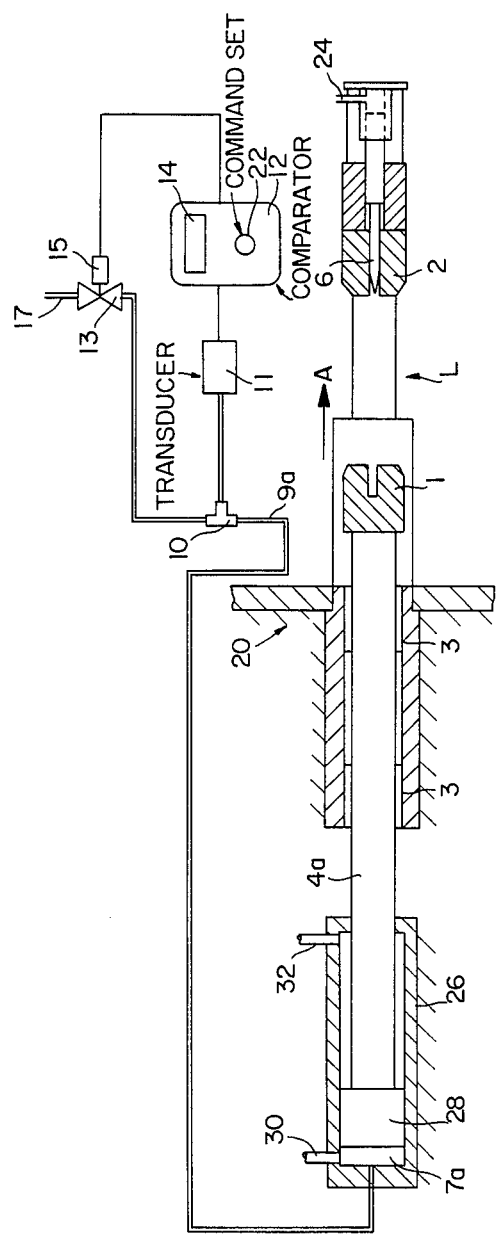
Figure 3:
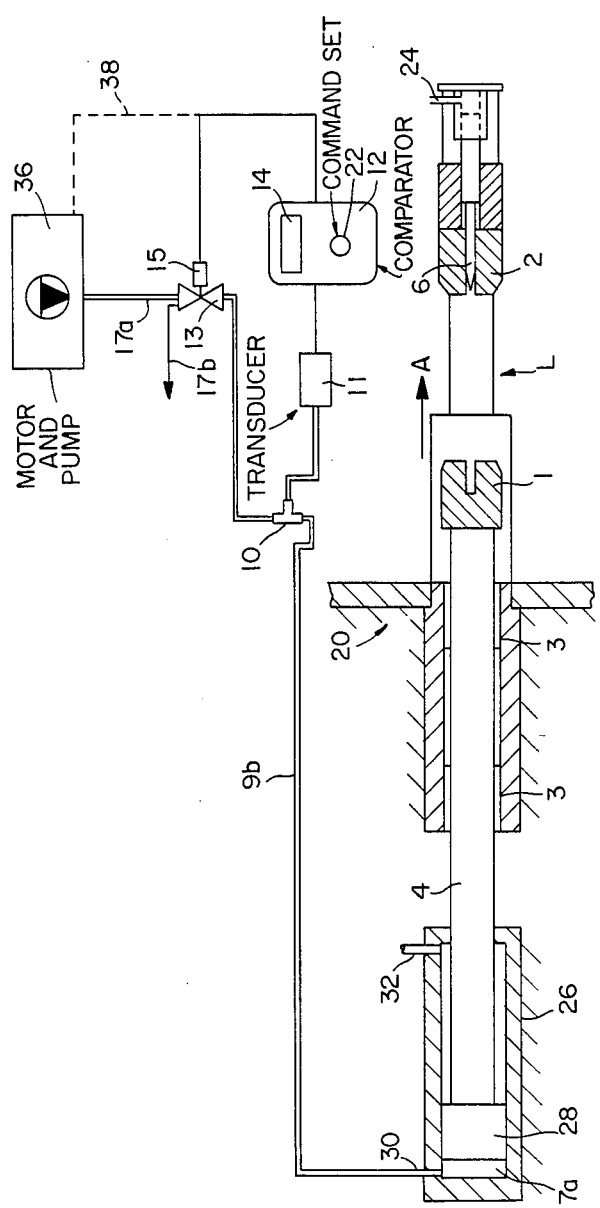

Bag closing machines, in general—see for example FIG. 1—have a machine housing 20 and may include a mechanical drive 5, including a vertical shaft 5a. The apparatus includes two welding jaws 1,2. The welding jaws can be heated, for example by suitable electrical heaters (not shown) in accordance with well-known construction. When the jaws are opened, the space L results between the ends of the welding jaws 1,2, through which, from above, a tubular foil, for example of thermoplastic, can be guided. The first jaw 1 is movably located in slide bearings 3, receiving a control rod 4, to be movable in horizontal direction in accordance with the arrow A to approach and move towards the second, fixed jaw 2. The closure movement is generated by a cam disk 18, rotated by shaft 5a, which engages a cam follower roller 20. Other drives, for example a crank drive, or the like, may be used to move the rod 4, and hence the jaw 1 back and forth towards the jaw 2. Return movement of the rod 4, for example under the influence of a spring, is not shown for simplicity of the drawing, since such apparatus is well known.

In accordance with a feature of the invention, a fluid cushion or pillow 7 is located between the rod 4 and the jaw 1. The fluid pillow 7 can be inflated, more or less, under fluid pressure. The fluid may be oil, such as a pressure oil, or may be a gas, for example compressed air. The fluid pillow or cushion 7 thus has the effect that the rod 4 and the jaw 1 do not form a stiff composite combination; rather, the fluid cushion or pillow permits changing of the engagement pressure of a foil placed in the space L between the jaw 1 and the jaw 2.

A pressure line 9 is connected in fluid communication to the cushion or pillow 7. The pressure line 9 is connected to a branching T 10. The T is connected to a transducer 11 and to a valve 13. The transducer 11 senses the pressure in line 9 and converts the pressure sensed into an electrical signal. The electrical signal is supplied to a comparator 12 which may include an analog/ digital converter. The comparator 12 receives as an input a command set value, for example set by a control knob 22 in digital form—and provides an error, or deviation signal. The value received from the transducer 11 is indicated on an indicator or display 14. In accordance with a preferred form of the invention, the pressure measured by the transducer 11 is digitized, compared with digital input provided by the command set input 22, and, respectively, the command set value or the indicated transduced value is shown on the display 14.

The comparator 12 can be in the form of any well-known programmable computer-type element which compares, in digital form, the digital pressure value derived from transducer 11 with the command set value entered in the command set input 22.

A deviation or output signal from the comparator 12 is applied over an output line to a servo positioning element 15 of valve 13. The servo positioning element may, for example, be a solenoid. Appropriate amplifiers have been omitted from the drawing for clarity, since they can be used as necessary. The servo positioning element 15 and valve 13—which is, for example, a proportional positioning spool valve, controls either application of pressurized fluid from a line 17a or drainage of pressurized fluid to a line 17b. Of course, other equivalent control systems may be used, for example a single line 17 emanating from valve 13 for, selectively, controlling application or drainage of pressurized fluid. As a result of the control of pressurized fluid by valve 13, pressure in the fluid cushion or pillow 7 can be changed.

OPERATION

The pressure measured or sensed in the transducer 11 is converted into an electrical quantity which, for example after digitizing in an analog/digital (A/D) converter, is compared with an electrical value set by the command set control 22. The pressure value, as well as the command set value, can be indicated either simultaneously or sequentially under, for example, operator control, by the display 14. If there is non-coincidence between the actual pressure as sensed by transducer 11 and commanded pressure as entered in the command set input 22, a deviation or error signal will be applied to the servo positioning element 15 of the control valve 13 which will suitably, and in accordance, for example, with the sign and magnitude of the deviation signal, supply, or drain pressurized fluid to the branching T 10 and hence provide the appropriate pressure level to the cushion or pillow 7. The transducer 11, the comparator 12 with the display 14, the input control 22 and controller or positioning units 15 with valve 13 form a closed feedback loop to automatically adjust the pressure and the cushion 7.

The welding or sealing step carried out by the jaws 1,2, thus will proceed under precisely controlled and reproducible pressure conditions, since the pressure in the cushion or pillow 7 is exactly reproducible by setting the command set 22. A plastic foil between the jaws 1,2 will be sealed or welded always under the same conditions and time-consuming manual matching to different types of foils can be eliminated; different types of foils can be accurately and properly welded by merely changing the command set 22 to the optimum conditions therefor.

The jaws 1,2, are dual jaws, making two weld seams. A foil, for example to make a bag, can be separated between the dual welds or seams by a knife 6, which is integrated in the jaw 2, and operated under control of the fluid pressure aggregate, controlled by fluid pressure applied to an inlet 24, for example by hydraulic pressure. Separating a dual seam in a bag making machine is well-known and standard in the field. For example, if a tubular bag is placed in the space L, the arrangement permits sealing the top of an already filled bag with the lower portion of the jaws 1,2, separating the filled bag and, simultaneously, forming the bottom sealed closure of a bag above the already filled bag, to be filled with material and, after filling, to be moved downwardly through the space L. Reference is made to the referenced application by the inventor hereof for an example of a bag filling machine.

The welding and sealing jaws 1,2, are supplied with electrical heaters in customary manner—not shown—to heat the foil to the welding or sealing temperature, respectively. In a welding process, an intermelting of thermoplastic foil material at the weld seam will result; in sealing, a thin suitable layer becomes adhesive under influence of heat and seals two walls of the tubular foil structure being passed through the space L together.

The weld and sealing jaws 1,2 are so constructed that the dual seam will result, capable of being separated by the knife 6. A filled bag is thus sealed by a seam and, at the same time, a bottom wall seam is made for a subsequent bag to be filled. Upon opening of the jaws 1,2, the bag with the goods therein can drop off, the upper portion of the foil now sealed on the bottom, is filled and, thereafter, the foil is transported again by the length of the bag.

The jaws 1,2 can be in any suitable construction, for example extend in strip form in a direction transverse to the plane of the drawing.

Various changes and modifications may be made within the scope of the inventive concept.

I claim:

1. Tubular bag closing machine having a pair of closing jaws (1, 2) at least one jaw being relatively movable with respect to the other in a closing direction to close the jaws against each other and to seal walls of a tubular plastic element together to form a bag closure, comprising:
   a mechanical drive means (5) for moving said at least one of said closing jaws over a fixed path towards the other jaw (2), said mechanical drive means including a rotary-to-linear drive sytem (5, 5a, 18, 20; 4), providing a fixed displacement path for said at least one closing jaw;
   a pneumatic pressure element (7) pressing at least one of said closing jaws (1) against the other (2), said pneumatic pressure element (7) including a pneumatic pressure pillow or cushion (7) located between at least one of said closing jaws (1) and said rotary-to-linear drive system; and
   control means for controlling the pneumatic pressure applied to the pneumatic pressure element including
   command means (22) for preselecting and modifying a command value of commanded pressure;
   a pressure-electrical transducer (11) forming an actual pressure sensing means (11) coupled to and sensing actual pressure at the pneumatic pressure element (7) and providing an actual fluid pressure value;
   comparator means (12) connected to receive the command value and the actual fluid pressure value for comparing said values and for providing a deviation signal if the values do not agree; and
   a controlled valve means (13, 15) receiving the deviation value from said comparator means (12) connected to the pneumatic pressure element (7) for controlling pneumatic pressure therein to the level of said commanded value;

said valve means (13) including an inlet line (17a) for pressurized pneumatic fluid and a drain line (17b) and a servo positioning element (15) coupled to the comparator means and selectively opening or closing said inlet and said drain lines (17a, 17b) depending upon the deviation signal, whereby the opening and closing of said valve means need only compensate for a deviation between the command value and the actual pneumatic pressure value; said command means, said actual pressure sensing means (11), said comparator means, and said control valve means being connected into a closed control servo loop.

2. Machine according to claim 1, wherein an indicator or display (14) is coupled to said comparator means and the indicating, selectively, the actual pressure transduced by said transducer and the command pressure applied to the comparator means by the command means (22).

* * * * *